United States Patent [19]

Böres et al.

[11] Patent Number: 5,736,643
[45] Date of Patent: Apr. 7, 1998

[54] MONITORING SYSTEM FOR REPRESENTING VIBRATION CONDITIONS OF A MULTIPLICITY OF BLADES ON A ROTATING DISC

[75] Inventors: Hans-Jochen Böres; Meinrad Gloger, both of Mülheim an der Ruhr; Michael Jung, Essen, all of Germany

[73] Assignee: Siemens Aktiengesellschaft, Munich, Germany

[21] Appl. No.: 589,399

[22] Filed: Jan. 22, 1996

Related U.S. Application Data

[63] Continuation of PCT/EP94/02258, Jul. 11, 1994 published as WO95/03530, Feb. 2, 1995.

[30] Foreign Application Priority Data

Jul. 20, 1993 [EP] European Pat. Off. ............... 93111618

[51] Int. Cl.⁶ .......................................................... G01H 1/00
[52] U.S. Cl. ............................................................... 73/660
[58] Field of Search ................................ 73/660, 661, 593, 73/658, 659; 364/508, 551.02; 340/683, 682; 324/243, 207.22, 207.16, 207.15

[56] References Cited

U.S. PATENT DOCUMENTS

| | | |
|---|---|---|
| 4,518,917 | 5/1985 | Oates et al. ................... 73/660 |
| 4,604,699 | 8/1986 | Borcherdt et al. . | |
| 4,614,117 | 9/1986 | Taniguti ........................ 73/660 |
| 4,847,556 | 7/1989 | Langley ........................ 73/660 |
| 4,887,468 | 12/1989 | McKendree et al. ......... 73/660 |
| 4,934,192 | 6/1990 | Jenkins . | |
| 4,996,880 | 3/1991 | Leon et al. ................... 73/660 |

FOREIGN PATENT DOCUMENTS 0327865  8/1989  European Pat. Off. .

OTHER PUBLICATIONS

NTIS Tech Notes, Mar. 1987, p. 298, "Portable, Computerized Seismac Recorder: etc." (Borcherdt et al.);.
VGB–Fachtagung, Dec. 13, 1990, pp. 4–11, (Gloger);.
Siemens: Advanced LP Turbine Blading–A Reliable and Highly Efficient Design: Presented at 1992, Int. Joint Power Generation Conference, Atlanta, Ga; (Gloger et al.);.

*Primary Examiner*—Hezron E. Williams
*Assistant Examiner*—Nashmiya N. Ashraf
*Attorney, Agent, or Firm*—Herbert L. Lerner; Laurence A. Greenberg

[57] ABSTRACT

A monitoring system for representing vibration conditions of a multiplicity of blades on a rotating disc in a turbomachine includes at least one sensor which is associated with the disc and which is connected to a pulse generator that delivers sensor pulses which respectively mark an instant at which a blade passes the sensor, a mark pick-up which always delivers a mark pulse when the disc is in a certain zero position, and an analysis device. The latter has an allocation module which takes account of the mark pulses and associates each sensor pulse with the blade which has caused it when passing a sensor. The allocation module calculates vibration data from the associated sensor pulses, which characterize the vibration conditions of the blade. A memory module has access to a working memory to which the vibration data are supplied and the memory module stores the vibration data in the working memory. In addition, the monitoring system has a representation device through the use of which the vibration data can be called up from the working memory and can be represented on at least one representation medium.

17 Claims, 2 Drawing Sheets

MONITORING SYSTEM FOR REPRESENTING VIBRATION CONDITIONS OF A MULTIPLICITY OF BLADES ON A ROTATING DISC

CROSS-REFERENCE TO RELATED APPLICATION

This application is a Continuation of International Application Serial. No. PCT/EP94/02258, filed Jul. 11, 1994 published as WO95/03530, Feb. 2, 1995.

BACKGROUND OF THE INVENTION

Field of the Invention

The invention relates to a monitoring system for representing vibration conditions of a multiplicity of blades on a rotating disc, including:
a) a stationary sensor device having at least one sensor associated with the disc and a pulse generator connected to the sensor for generating a sensor pulse marking an instant at which a blade passes the sensor;
b) a mark pick-up being associated with the disk for generating a mark pulse when the disc is in a certain zero position;
c) an analysis device having an allocation module to which the sensor pulses and the mark pulses are to be supplied for associating each sensor pulse with that blade which has caused it while taking the mark pulses into account, and for converting the sensor pulse of each blade into vibration data characterizing a vibration condition of the blade; and
d) a representation device with a representation medium for representing the vibration data.

Such a monitoring system is to be found in an article entitled: "Berührungslose Schaufelschwingungsmeβtechnik" [Contactless Blade Vibration Measurement Technique] by M. Gloger, in the Conference Report of the 1990 VGB Specialist Conference on Steam Turbines and Steam Turbine Operation, Dec. 13, 1990 in Essen, Germany, Pages 4.1 to 4.11, in U.S. Pat. No. 4,934,192 as well as in Published European Patent Application 0 327 865 A2, corresponding to U.S. Pat. No. 4,955,269.

The invention especially pertains to the representation of vibration conditions of blades, which appear during regular operation of a turbomachine and, according to one explanation, cause essential pressure of the blades in certain operating conditions or in every operating condition.

A report concerning the structure of blades, particularly blades for low-pressure steam turbines, is to be found in a paper entitled: "Advanced LP Turbine Blading—A Reliable And Highly Efficient Design" by M. Gloger, K. H. Neumann, D. Bergmann and H. Termühlen, presented in 1992 at the "1992 International Joint Power Generation Conference" in Atlanta, Ga. and published in printed form by the ASME Power Division. That paper also considers a monitoring system for representing vibration conditions of a multiplicity of blades of the type mentioned in the introduction.

A report concerning the representation of vibration conditions of blades in turbomachines is found in the article entitled: "Berührungslose Schaufelschwingungsmeβtechnik" [Contactless Blade Vibration Measurement Technique] by M. Gloger, in the Conference Report of the 1990 VGB Specialist Conference on Steam Turbines and Steam Turbine Operation, Dec. 13, 1990 in Essen, Germany, Pages 4.1 to 4.11. The complete contents of that paper are hereby included in this description.

Systems for detecting vibrations at turbine blades are described in U.S. Pat. No. 4,934,192 and in Published European Patent Application 0 327 865 A2, corresponding to U.S. Pat. No. 4,955,269. In the first document, it is in particular axial vibrations of a turbine blade, i.e. vibrations at right angles to the plane in which the turbine blade attached to a rotating disc circulates, which are detected, with that being achieved through the use of two sensors disposed one behind the other. Detection of tangential vibrations, i.e. vibrations in the plane in which the turbine blade circulates, is also possible. The measurements obtained through the use of the sensors are analyzed, optionally displayed as a diagram and checked to see whether or not they justify an alarm. In the second of the documents mentioned above, conclusions on the accumulated fatigue of the turbine blade material due to the vibrations are drawn from the turbine blade vibration data obtained through the use of suitable sensors.

U.S. Pat. No. 4,604,699 concerns a system for recording, analyzing and presenting data in association with the observation of earthquakes and not in association with an application in the power station industry.

All of the previous monitoring systems of the type mentioned in the introduction and described in the cited prior art documents are suitable for occasional checking of blades in turbomachines such as turbines and turbo compressors. However, they are not suitable for continuous monitoring of a turbomachine during regular operation. It follows that those monitoring systems cannot be considered for detecting increased loads on blades of a type which can occur under certain operating conditions. Such loads can hardly be predicted with sufficient precision because the geometry of the blades, which geometry is relevant to the initiation of vibrations, and their support structures, is complex. Particularly where occasionally operating conditions occur which deviate from the operating conditions for which the blades were constructed, it is never possible to exclude the possibility that vibrations will occur on the blades with increased, and under certain circumstances critical, amplitudes.

SUMMARY OF THE INVENTION

It is accordingly an object of the invention to provide a monitoring system for representing vibration conditions of a multiplicity of blades on a rotating disc, which overcomes the hereinafore-mentioned disadvantages of the heretofore-known systems of this general type, which permits continuous representation of vibration conditions and which is preferably able to indicate increased loads on blades due to vibrations in sufficiently good time for the operating condition causing the vibrations to be ended before the occurrence of impairment, in particular impairment of the life of the blades. Such a monitoring system should be suitable, in particular, for continuous monitoring of the blades. It should also preferably continuously present relevant vibration data for each blade or hold the data ready for presentation.

With the foregoing and other objects in view there is provided, in accordance with the invention, a monitoring system for representing vibration conditions of a multiplicity of blades on a rotating disc, comprising:
a) a stationary sensor device having at least one sensor associated with a rotating disc and a pulse generator connected to the at least one sensor for generating a sensor pulse marking an instant at which a blade on the disc passes the at least one sensor;
b) a mark pick-up being associated with the disk for generating a mark pulse when the disc is in a given zero position;

c) a representation device having a representation medium for representing the vibration data; and d) an analysis device having an allocation module for receiving the sensor pulses and the mark pulses, for allocating each sensor pulse to a blade having caused the sensor pulse while taking the mark pulses into account, and for converting the sensor pulse of each blade into vibration data characterizing a vibration condition of the blade, the analysis device having a working memory and a memory module for accessing the working memory, for receiving a multiplicity of vibration data for each blade in time sequence, and for providing the vibration data to be called up from the representation device, the working memory storing the vibration data for all of the blades being supplied to the memory module, and the working memory acting as a shift register for transferring and overwriting the vibration data having already been stored upon new vibration data being supplied.

The following explanation is given with respect to the various component parts of the monitoring system:

a) A pulse generator, which is associated with a sensor in a sensor device, is to be understood to mean any device necessary for operating the sensor and for connecting the sensor to further devices without intending a limitation, wherein amplifiers, pulse formers, electro-acoustic converters and the like are named as examples. The essential function of a pulse generator is to provide the signal emitted by the sensor in a manner, form and intensity that are suitable for the necessary further processing.

b) A mark pick-up is understood to mean any device which, substantially independently of the vibration conditions of the blades, emits a pulse sequence, namely a sequence of mark pulses, that is synchronous with the rotation of the disc or can at least be synchronized with it and which correspondingly permits a conclusion, from the position in time of a sensor pulse relative to the mark pulses, on which blade has caused the sensor pulse. On this point, reference is made to the cited prior art.

c) With respect to the function of converting sensor pulses into vibration data by the allocation module, it should be noted that this conversion can likewise signify any necessary transformation of the sensor pulses. In this regard, consideration can initially be given to any necessary analog/digital conversion, amplification and/or pulse forming, which are known per se and are necessary, depending on the structure of the monitoring system. The sensor pulses do, of course, themselves represent signals which characterize a vibration condition of a blade and can therefore be considered as vibration data, if necessary after analog/digital conversion. However, more complex forms of conversion also come into consideration, in particular such conversions that require arithmetic operations, which are conditioned if necessary on the sensor pulses. Reference is made on this point to an example described below.

d) The representation of vibration data by the representation device can also, depending on the requirement, be connected with computational operations on the vibration data which are called up from the working memory. It is by no means necessary for the vibration data to be stored in a form being immediately accessible to representation and therefore requiring no further rework before its actual representation. Corresponding measures are to be understood as being included, in each case, in the process of representation. A preparation of the vibration data for further analysis, particularly as part of a diagnosis system for the early recognition of damage, is also associated with a "representation". Such preparation can include, in particular, the selection of vibration data in accordance with certain criteria and the generation of signals which symbolize certain conclusions with respect to the vibration data.

Processing of the sensor pulses and mark pulses takes place in the monitoring system according to the invention and this processing is particularly matched to the large number of such sensor pulses and mark pulses arriving per unit of time, as they occur in the operational monitoring of a conventional turbomachine, such as a low-pressure steam turbine in a power station. A disc of a low-pressure steam turbine in a power station usually has between 50 and 100 blades and rotates, in regular operation, with a rotational speed of 1500, 1800, 3000 or 3600 revolutions per minute, depending on the frequency of the electricity supply grid into which the power station feeds electricity and on whether a generator fitted downstream of the steam turbine has four or two rotating magnet poles. Sensor pulses with frequencies of several kilohertz correspondingly arrive from each sensor of a disc. This requires both very rapid processing and a particular manner of storing and analyzing the sensor pulses, as well as the vibration data which can be gained from these sensor pulses and which characterize the vibration conditions of the blades.

Through the use of the monitoring system, the vibration data corresponding to blade vibration conditions are obtained by analysis of the time sequence of pulses, with each pulse having a variation with time which substantially corresponds to a specified standard. It is therefore appropriate and advantageous to form sensor pulses which correspond to a preselectable standard from the pulses that are directly taken from a sensor and which, under certain circumstances, are complex in their time variation. Standards which can be considered for this purpose are, for example, the TTL standard and the ECL standard. The further analysis of the sensor pulses has to be particularly directed to their association with the individual blades, which is determined from their time relationship with the mark pulses, and the correlations in time among the sensor pulses that are respectively associated with a turbine blade. Conclusions have to be drawn about the vibration condition of a blade from these correlations. The vibration condition of a blade is modulated onto the associated sensor pulses in the manner of a pulse/phase modulation. All of the conceivable methods for demodulating a signal on which information is imposed by pulse/phase modulation can, therefore, be considered in order to determine parameters which directly characterize the vibration condition and which are largely independent of the circulating motion of the blade and the type of sensor pulses caused by it.

The working memory or another memory, in particular one associated with the representation device, is preferably of sufficiently large dimensions to ensure that it can store all of the vibration data arriving during a period of more than 10 seconds and preferably of approximately 20 seconds, during regular operation when the disc is, therefore, usually rotating at the 1500, 1800, 3000 or 3600 revolutions per minute already mentioned. Storage of all of the arriving vibration data for a period of up to one minute is a particular advantageous possibility, with the execution of such storage being possibly made dependent on a certain criterion, for example a warning signal, which would be emitted by a test module connected to the monitoring system and described in detail further below. In regular operation, storage of the vibration data over a period of approximately 20 seconds is regarded as being sufficient but the possibility of storing for a longer period, in particular up to a minute, is of advantage in a critical operating condition.

In accordance with another feature of the invention, the sensor device has two sensors which are associated with the disc and spaced apart over a periphery of the disc, and each item of the vibration data is calculated for each blade from a time difference between an associated sensor signal from a first sensor and an associated sensor signal from a second sensor. A so-called two-sensor measurement configuration is achieved in this manner. The two-sensor measurement configuration delivers a time difference as the item of vibration data, which is the sum of a constant proportion, that is given by the rotational speed and corresponds to the circumferential distance between the sensors, and of a value which can only be different from zero when the blade executes a vibration. It is clear that not every possible vibration of a blade delivers a signal which can be detected by the two-sensor measurement configuration. However, blade vibrations which take place in the peripheral direction of the disc can at least be detected when their respective frequency does not correspond to the rotational frequency of the disc or a whole-number multiple of this rotational frequency. The above-defined value which can be determined by the two-sensor measurement method approximately corresponds to a displacement that the blade tip of the vibrating blade has traversed, between the first sensor and the second sensor, in a reference system rotating with the disc. No attempt is made in this case to provide a detailed presentation of the analysis of the sensor pulses as part of the two-sensor measurement method and reference should be made to the already mentioned article entitled: "Berührungslose Schaufelschwingungsmeβtechnik" [Contactless Blade Vibration Measurement Technique].

In accordance with a further feature of the invention, electromagnetic sensors are used as the sensors. Such electromagnetic sensors can, for example, be installed in a casing of a turbomachine in such a way that when the disc rotates, the blade tips of all of the blades on it sequentially approach until they are a short distance from the sensor and then move away again. A blade having a tip which is thus located near the sensor modifies a magnetic field which emerges from a magnet in the sensor and in this way induces an electrical pulse in a coil belonging to the sensor. Such an electrical pulse is, of course, bipolar because both possible electrical polarities occur, one after the other, in this pulse. The "crossover" of the pulse, i.e. the instant at which its polarity changes, is a preferred criterion for initiating a standardized sensor pulse in a pulse generator connected downstream of the sensor.

In accordance with an added feature of the invention, the working memory has dimensions which are sufficiently large for it to store all of the vibration data for a respective period in which the disc executes at least 100 revolutions. This ensures that the totality of data available in the working memory always provides a clear and complete picture of the vibration conditions of the blades being monitored.

In accordance with an additional feature of the invention, the analysis device has a test module for checking the vibration data stored in the working memory in accordance with at least one test criterion and the representation device provides an appropriate warning signal when it discovers vibration data which do not satisfy the test criterion. Such a test module is used, in particular, to recognize increased loads on the blades due to vibrations and, advantageously, to do this in sufficiently good time for the operating condition of the blades to be changed before an impairment occurs. It is particularly advantageous for the test criterion of the test module to be formulated in such a way that a warning signal has already been generated before vibration conditions appear which could impair the life of the blades. In the case where a load impairing the life of the corresponding blade should occur before the possibility of changing a dangerous vibration condition, a loss of blade life can be determined and represented for each blade, possibly with additional warnings, if the loss of blade life should add up in the course of time to a value that comes critically close to a total blade life to be assumed.

In accordance with yet another feature of the invention, the reaction of the representation device to a warning signal from the test module takes place in such a way that a multiplicity of vibration data are called up from the working memory, including the vibration data which do not satisfy the test criterion, and are represented, preferably together with a warning. If appropriate, an additional analysis of the warning signal and the vibration data causing it is possible, particularly with respect to a possible usage of blade life or, equivalently expressed, an increase in the fatigue of the blade with which the vibration data are associated. Such an analysis can take place in both the analysis device and the representation device.

In accordance with yet a further feature of the invention, the vibration data are called up by the representation device for a period of more than 10 seconds in each case, and in particular approximately 20 seconds. In this way, upon each warning signal, a large mass of data including at least substantial parts of the "previous history" and of the "subsequent course" of a vibration condition causing the warning signal is available to the representation device for representation and if desired, further analysis. This can support and increase the depth of the investigation of the vibration condition.

A wide variety of criteria, which may also be complex under certain circumstances, can be considered as test criteria. A first possibility is to investigate, in combined form, a large number of vibration data which follow one another in time sequence. The combined form can, for example, be an average. This permits the load on the blades due to vibrations to be averaged over a plurality, and preferably a large multiplicity, of revolutions of the disc. Such an average can be compared with a suitable limiting value in order to investigate whether or not a critical vibration condition is present. In order to draw conclusions which refer to the complete disc or larger segments of the disc, vibration data from all of the blades or vibration data from certain numbers of blades can be analyzed together. Of course, a separate investigation of the vibration data for each individual blade is also possible. A decision as to whether it is carried out or not can, if appropriate, be made dependent on further test criteria, where appropriate sensor devices are available, for example a sensor device with a two-sensor measurement configuration. It is also possible, in addition to detecting a vibration condition of an individual blade on its own, to detect a so-called system vibration, i.e. a vibration of the complete configuration of disc and blades. Suitable test criteria can also be formulated therefor. The warning signals and warnings associated with the test criteria can be composed to suit their respective importance. Depending on the importance of the associated test criterion, a warning can have a character between a simple finding and an unconditional order to immediately terminate the operating condition leading to the vibrations.

In accordance with yet an added feature of the invention, the monitoring system is constructed for representing vibration conditions of blades on a plurality of discs in a turbomachine or in a plurality of turbomachines. In this way, the monitoring system permits complete monitoring of an installation with a turbomachine having blades which could be endangered by vibrations.

In accordance with yet an additional feature of the invention, the monitoring system also permits the vibration conditions of each blade on the disc or the discs to be represented.

In accordance with again another feature of the invention, the working memory stores the vibration data of the blades occurring in a period of 20 seconds during regular operation, and the working memory stores the vibration data of the blades occurring in a period of 60 seconds in a critical state of operation being initiated by a warning signal.

In accordance with again a further feature of the invention, the monitoring system diagnoses a turbomachine with vibration data on all of the blades of the turbomachine being held ready for representation in the working memory during the operation of the turbomachine.

In accordance with a concomitant feature of the invention, the turbomachine is a steam turbine, in particular a saturated-steam steam turbine. In such saturated-steam steam turbines, which are employed, in particular, as the low-pressure turbines in turbosets, the blades are relatively long and attain lengths of one meter and more in the final stages. Parts that are fitted to damp vibrations, such as shrouds, can no longer be considered for such blades so that vibrations occur preferentially and to a large extent on those blades. The monitoring of precisely those blades is therefore of particular importance as part of a diagnosis which advantageously relates to the complete turboset and all of the installations which are connected to the turboset.

Other features which are considered as characteristic for the invention are set forth in the appended claims.

Although the invention is illustrated and described herein as embodied in a monitoring system for representing vibration conditions of a multiplicity of blades on a rotating disc, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
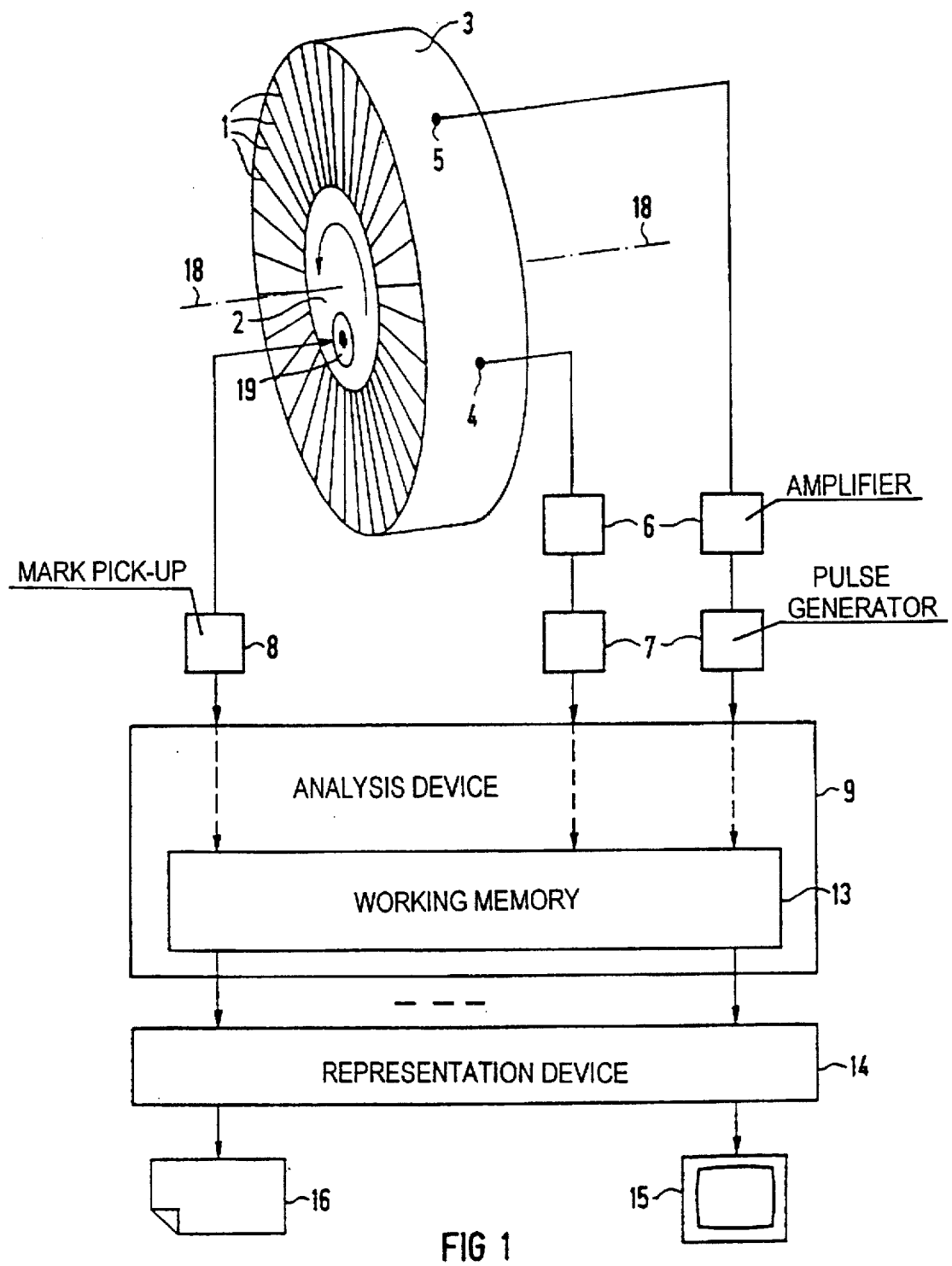
FIG. 1 is a diagrammatic, perspective view of a disc of a turbine with turbine blades, and a block circuit diagram of a sensor device, an analysis device and a representation device.

Referring now to the figures of the drawing in detail and first, particularly, to FIG. 1 thereof, there is seen a part of a turbomachine 3, in particular a disc 2, on which blades 1 (symbolized by radial lines) are fastened. The disc or rotor disc 2, together with the blades 1, can be rotated about a center line 18 in the direction of a curved arrow. In order to detect vibration conditions of the blades 1, the turbomachine 3 is provided with a sensor device, including a first sensor 4 and a second sensor 5 (both sensors are symbolized by black dots), together with amplifiers 6 and pulse generators 7 associated with these sensors 4, 5. When the disc 2 is rotated in the manner represented, each blade 1 first passes the first sensor 4 and then passes the second sensor 5. A complete revolution of the disc 2 therefore produces two sensor signals for each blade 1.

In order to permit the sensor signals to be associated with the blades 1, the disc 2 also has a mark 19 which always remains substantially unaffected by vibrations of the blades 1 or of the complete system made up of the blades 1 and the disc 2. This mark is observed by a mark pick-up 8. Whenever the mark 19 is located at a specified position, the mark pick-up 8 emits a mark pulse. The timing of the sensor pulses relative to the mark pulses permits the desired association between the sensor pulses and the individual blades 1. The pulse generators 7 and the mark pick-up 8 deliver their sensor or mark pulses to an analysis device 9. The sensor pulses and the mark pulses are initially processed in this analysis device 9 in such a way that the sensor pulses are associated with the blades 1 which cause them, and the sensor pulses associated in this way are subsequently converted into vibration data which characterize the vibration conditions of the blades 1. These vibration data are stored in a working memory 13 in the analysis device 9 and there they are available for representation by a representation device 14 which has access to the working memory 13. The representation of the vibration data can take place on various representation media 15 and 16, in particular on a viewing screen 15 and/or on a print-out 16. The manner of representation of the vibration conditions is not subject to any limitation.

The configuration represented in FIG. 1 with a first sensor 4 and a second sensor 5 permits the performance of the two-sensor measurement method which is known from the cited prior art and which is particularly successful for detecting vibration conditions.

Figure 2:
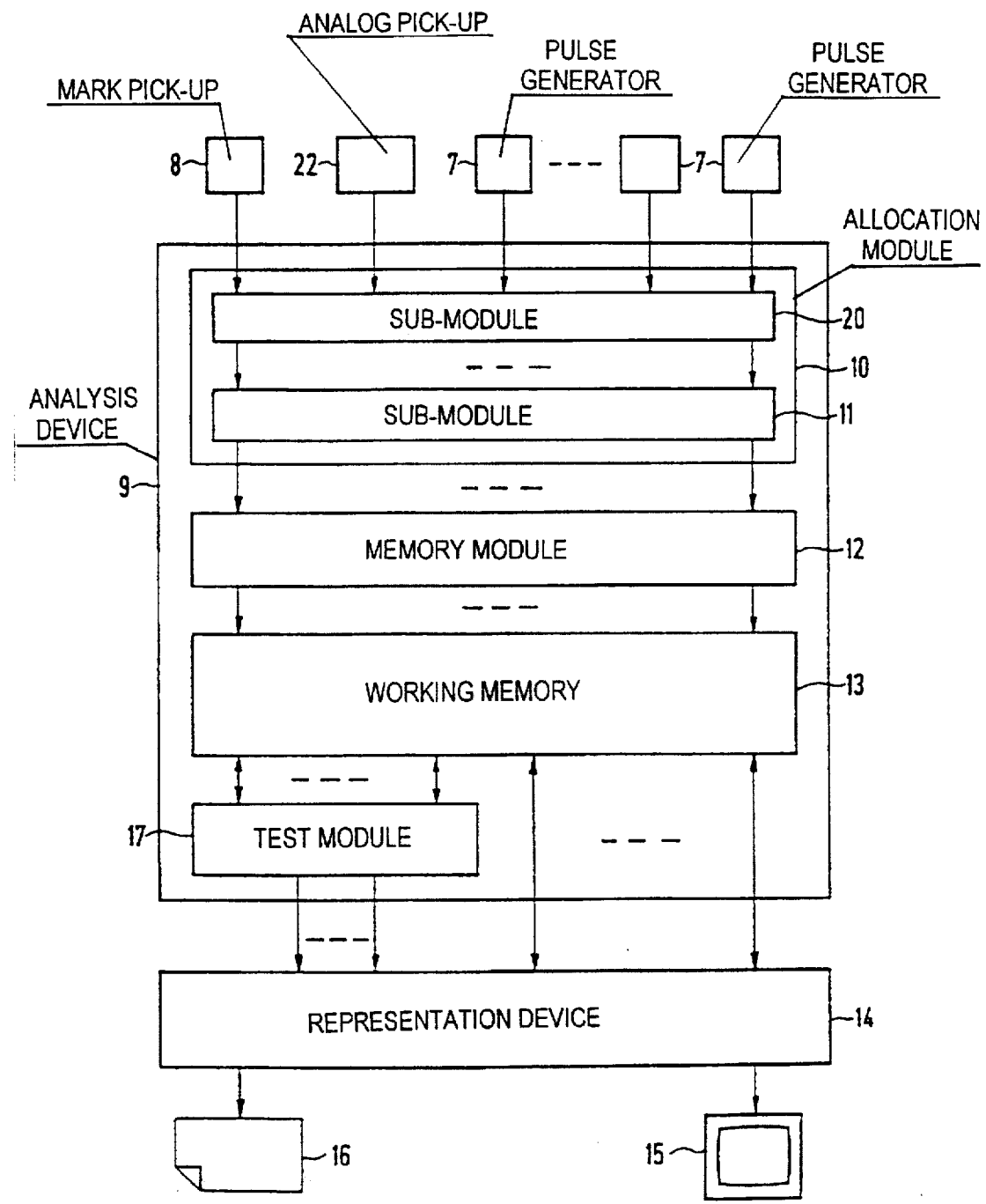
FIG. 2 is a block circuit diagram of an analysis device and a representation device for a monitoring system as part of a particular embodiment.

Details of the processing of the sensor pulses and the mark pulses are provided by the exemplary embodiment of FIG. 2. In this figure, the main emphasis is placed on the representation of the structures of a particularly preferred embodiment of the analysis device 9 and of the representation device 14. The mark pulses and the sensor pulses are supplied to the analysis device 9 by a mark pick-up 8 and multiple pulse generators 7. FIG. 2 also shows an analog pick-up 22 through the use of which further analog measurement data concerning the turbomachine, to which the analysis device 9 is connected, can be supplied to the analysis device 9. The analysis device 9 has a modular construction and includes an allocation module 10, to which the pulse generator 7 supplies the sensor pulses, the mark pick-up 8 supplies the mark pulses and the analog pick-up 22 supplies the analog measurement data. All of the input pulses and measurement data are first associated with the individual blades in the allocation module 10. These pulses and data are subsequently converted into vibration data which are adapted to the further, preferably digital, processing. This conversion implies, in particular for each blade, the demodulation of the sequence of associated sensor pulses modulated by the vibrations of the blade in the manner of pulse/phase modulation. The allocation module supplies the vibration data to a memory module 12 which has access to a working memory 13 and stores the vibration data in this working memory 13. The storage takes place in such a way that the working memory 13 is operated as a shift register. Since the capacity of the working memory 13 is naturally finite, the oldest stored set of vibration data is erased and overwritten with the second-oldest set on the arrival of a new set of vibration data. This continues, until finally the space taken up by the most recently stored set of vibration data is available for storing the new set.

The representation device 14 which was already mentioned, communicates with the working memory 13. This representation device 14 has essentially arbitrary access to the working memory 13 and can, as specified, call up vibration data from the working memory 13 and represent it on representation media 15 and 16. In addition, the working memory 13 communicates with a test module 17 which inspects the stored vibration data in accordance with a test criterion or a plurality of test criteria and supplies warning signals to the representation device 14 when vibration data are determined which do not satisfy a test criterion. Continuous monitoring of the blades for vibrations, in particular critical vibrations, is possible in this way with the aid of the test module 17 and the method of representation of vibration conditions of blades is included for continuous diagnosis. The further processing of the warning signals is the task of the representation device 14. Upon the occurrence of a warning signal, the vibration conditions determined by the test module 17 can first be represented and, if need be, appropriate warnings are given.

The allocation module 10 has its own structure and contains a sorting sub-module 20 which undertakes the already mentioned association of the sensor pulses with the blades, as well as a computational sub-module 11 which is subjected to data from the sorting sub-module 20 and takes care of any necessary conversions of the sensor pulses and their provision in the form adapted to further processing. It should be mentioned that the illustrated configuration of the sorting sub-module 20 and the computational sub-module is by no means imperative and can be readily effected in the reverse manner as well. In this connection, it should again be noted that the formats and values of the vibration data, which are generated and processed in the analysis device 9 and are made available to the representation device 14, do not by any means have to be directly accessible to interpretation by an operator of the monitoring system. The preparation of the vibration data in a form which is directly accessible to human understanding can be left, finally, to the representation device 14, depending on the embodiment of the monitoring system.

The monitoring system permits a diagnosis of a turbomachine with respect to vibration conditions of blades in the turbomachine. It can make an important contribution with respect to continuous inspection of the turbomachine and to early recognition of possible impairments so that a clear gain in operational reliability and increased flexibility in operation can be achieved.

We claim:

1. A monitoring system for representing vibration conditions of a multiplicity of blades on a rotating disc, comprising:

a) a stationary sensor device having at least one sensor associated with the rotating disc and a pulse generator connected to said at least one sensor for generating a sequence of sensor pulses, with each sensor pulse of the sequence marking an instant at which a blade on the rotating disc passes said at least one sensor;

b) a mark pick-up associated with the disc for generating a sequence of mark pulses, with each mark pulse being generated when the disc is in a given zero position;

c) an analysis device having an allocation module for receiving the sensor pulses and the mark pulses, for allocating each sensor pulse to the respective blade having caused the sensor pulse while taking the mark pulses into account, and for converting the sensor pulse of each blade into a multiplicity of vibration data characterizing a vibration condition of said each blade, said analysis device having a working memory for receiving the multiplicity of vibration data for each blade in time sequence, said analysis device having a memory module for accessing said working memory, said working memory storing the vibration data for all of the blades being supplied to said memory module, and said memory module operating said working memory as a shift register for shifting older vibration data having already been stored in the register and overwriting the oldest vibration data with new vibration data when the working memory has filled up; and d) a representation device having a representation medium for representing the vibration data currently stored in said working memory.

2. The monitoring system according to claim 1, wherein:
    said at least one sensor includes first and second sensors mounted on and mutually spaced apart over the periphery of the disc; and
    each vibration datum for each blade is calculated from a time difference between an associated sensor pulse from said first sensor and an associated sensor pulse from said second sensor.

3. The monitoring system according to claim 1, wherein said at least one sensor is an electromagnetic sensor.

4. The monitoring system according to claim 3, wherein said at least one sensor is a distance-sensitive sensor for outputting a pulse when a blade passes the at least one sensor.

5. The monitoring system according to claim 1, wherein said working memory stores all of the vibration data for a period in which the disc executes at least 100 revolutions.

6. The monitoring system according to claim 1, wherein said analysis device contains a test module for checking the vibration data currently stored in said working memory in accordance with at least one test criterion and for supplying an appropriate warning signal to said representation device when the currently stored vibration data do not satisfy the test criterion.

7. The monitoring system according to claim 6, wherein said representation device calls up a multiplicity of vibration data from said working memory, including vibration data not satisfying the test criterion, and represents them, upon issuance of the warning signal.

8. The monitoring system according to claim 7, wherein said working memory represents the vibration data not satisfying the test criterion, together with the warning.

9. The monitoring system according to claim 7, wherein said representation device calls up the vibration data representing a period of more than 10 seconds.

10. The monitoring system according to claim 7, wherein said representation device calls up the vibration data representing a period of more than approximately 20 seconds.

11. The monitoring system according to claim 1, wherein said representation device represents vibration conditions of blades on a plurality of discs in a turbomachine.

12. The monitoring system according to claim 1, wherein said representation device represents vibration conditions of blades on a plurality of turbomachines.

13. The monitoring system according to claim 1, wherein said representation device represents vibration conditions of each blade on at least one disc.

14. The monitoring system according to claim 1, wherein said working memory stores the vibration data of the blades occurring in a period of 20 seconds during regular operation, and said working memory stores the vibration data of the blades occurring in a period of 60 seconds in a critical state of operation being initiated by a warning signal.

15. The monitoring system according to claim 1, wherein vibration data on all of the blades of a turbomachine are held ready in said working memory for representation during operation of the turbomachine, to diagnose the turbomachine.

16. The monitoring system according to claim 15, wherein the turbomachine is a steam turbine.

17. The monitoring system according to claim 15, wherein the turbomachine is a saturated-steam steam turbine.

* * * * *